(12) United States Patent
Welch

(10) Patent No.: US 10,926,465 B2
(45) Date of Patent: Feb. 23, 2021

(54) RECOATER FOR ADDITIVE LAYER MANUFACTURE

(71) Applicant: ROLLS-ROYCE plc, London (GB)

(72) Inventor: Stewart T. Welch, Birmingham (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 15/927,268

(22) Filed: Mar. 21, 2018

(65) Prior Publication Data
US 2018/0272604 A1    Sep. 27, 2018

(30) Foreign Application Priority Data
Mar. 24, 2017   (GB) .................................. 1704676.4

(51) Int. Cl.
| | | |
|---|---|---|
| B29C 64/214 | (2017.01) | |
| B33Y 30/00 | (2015.01) | |
| B29C 64/153 | (2017.01) | |
| B05C 11/04 | (2006.01) | |
| B05C 11/06 | (2006.01) | |
| B33Y 10/00 | (2015.01) | |

(52) U.S. Cl.
CPC .......... *B29C 64/214* (2017.08); *B05C 11/045* (2013.01); *B05C 11/06* (2013.01); *B29C 64/153* (2017.08); *B33Y 30/00* (2014.12); *B33Y 10/00* (2014.12)

(58) Field of Classification Search
CPC ... B29C 64/188; B29C 64/214; B29C 64/153; B29C 64/124; B29C 64/165; B29C 64/393; B33Y 40/00; B33Y 30/00; B33Y 10/00; B05C 11/045; B05C 11/06; B05C 11/08; B23K 26/342; B22F 2003/1059; B08B 5/023; B08B 5/026; B05B 1/005; B05B 1/26; B05B 1/28; B05B 1/13; C23C 2/16

USPC ..... 118/62, 63, 50, 302, 304, 123; 15/316.1, 15/405
See application file for complete search history.

(56) References Cited

U.S. PATENT DOCUMENTS

| | | | | |
|---|---|---|---|---|
| 3,307,466 A | * | 3/1967 | Susumu ................. | G03D 5/067 |
| | | | | 396/607 |
| 4,331,099 A | * | 5/1982 | Topfer .................. | G03F 7/3057 |
| | | | | 118/413 |

(Continued)

FOREIGN PATENT DOCUMENTS

| | | |
|---|---|---|
| CN | 106392065 A | 2/2017 |
| EP | 0361847 | 4/1990 |

(Continued)

OTHER PUBLICATIONS

Extended European Search Report, issued in EP Application No. 18159225.4, dated Aug. 17, 2018, pp. 1-6, European Patent Office, Munich, Germany.

(Continued)

Primary Examiner — Laura Edwards
(74) Attorney, Agent, or Firm — Brinks Gilson & Lione

(57) ABSTRACT

An additive layer manufacturing apparatus comprising a doctor blade (57) having a tip (51) which, in use, is arranged proximal to a material layer (59) to be recoated during an additive layer manufacturing method, the doctor blade (57) having a cavity (50) with an inlet and an outlet, the outlet located at the tip (51) and the inlet connectable to an air supply (53) whereby air can be directed through the cavity (50) to the outlet and onto a surface (59a) of the material layer (59).

6 Claims, 5 Drawing Sheets

(56) References Cited

U.S. PATENT DOCUMENTS

| | | | |
|---|---|---|---|
| 5,238,614 A | 8/1993 | Uchinono et al. | |
| 5,824,259 A | 10/1998 | Allanic et al. | |
| 5,922,364 A | 7/1999 | Young, Jr. | |
| 6,192,547 B1* | 2/2001 | Song | B08B 5/02 15/308 |
| 7,045,738 B1 | 5/2006 | Kovacevic et al. | |
| 2003/0115709 A1* | 6/2003 | Haruch | B08B 5/023 15/309.2 |
| 2011/0024528 A1* | 2/2011 | Pucciani | B05B 1/005 239/597 |
| 2014/0178241 A1 | 6/2014 | Mironets et al. | |
| 2015/0251227 A1* | 9/2015 | Koelmel | G01N 21/88 348/373 |
| 2018/0200748 A1* | 7/2018 | Landa | B05C 11/06 |

FOREIGN PATENT DOCUMENTS

| | | |
|---|---|---|
| EP | 3 202 560 A1 | 8/2017 |
| GB | 201514620 * | 9/2015 |
| JP | 11221863 | 8/1999 |
| WO | WO 2016/106136 A2 | 6/2016 |
| WO | WO 2017/029623 A1 | 2/2017 |

OTHER PUBLICATIONS

Great Britain Search Report dated Jun. 26, 2017, issued in GB Patent Application No. 1704676.4.

European Office Action, issued in European Application 18 159 225.4, dated Sep. 12, 2019, pp. 1-4, European Patent Office, Rijswijk, Netherlands.

* cited by examiner

RECOATER FOR ADDITIVE LAYER MANUFACTURE

CROSS-REFERENCE TO RELATED APPLICATIONS

This application is based upon and claims the benefit of priority from British Patent Application No. 1704676.4 filed 24 Mar. 2017, the entire contents of which are incorporated by reference.

FIELD OF DISCLOSURE

The present disclosure relates to additive layer manufacturing methods and apparatus. More particularly, the present disclosure concerns a re-coater device (sometimes known as a "doctor blade") for use in an additive layer manufacturing method.

BACKGROUND

Additive layer manufacturing (ALM) methods are known. Broadly, such methods involve selected regions within a fluid mass of material being processed across a number of sequential layers to cause local solidification of the material. The sequential layers are built up to form a three dimensional solid object within the fluid mass.

Additive layer manufacturing methods can be broadly divided into two groups. In a first group, material is deposited sequentially in patterned layers, the pattern of each layer representing a two dimensional cross section of a three dimensional shape of an object. As each layer is deposited atop a previous layer, a three dimensional object is built. Examples of this group of methods include; direct energy deposition (where focussed thermal energy is used to fuse materials as they are being deposited), material extrusion (where an extrusion head moves in a pattern selectively dispensing material through an orifice as it travels) and sheet lamination (where sheets of material already defining a two-dimensional pattern are bonded in sequence to build up the three dimensional object.)

In the second group, the process starts with a bulk mass which may, for example, be a bed of powdered material such as a ceramic, a ferrous alloy or a non-ferrous alloy, or a vat of liquid typically comprising a photopolymer. Regions within the mass are selectively treated, for example by melting, sintering, photochemical reaction or interaction with a chemical bonding agent, to solidify. However unlike with the first group, the untreated material remains in a layer as the next layer is formed. Surplus (untreated) material may be removed when the three dimensional build is complete, through it is also known for surplus material sometimes to be contained within cavities of the three-dimensional object.

Within the second group of ALM methods, a layer of untreated material may be deposited onto an already treated layer by dispersal from a hopper or by dipping the treated layer below the surface of the untreated material. For the three-dimensional shape to be properly controlled, the thickness and consistency of thickness of each layer to be treated must be carefully controlled. This is conventionally achieved by positioning a top surface a fixed distance from the tip of a "doctor blade" which is then skimmed across a top surface of the material to level out the top surface.

Various forms of doctor blade are known. In its simplest form the doctor blade is a straight-edged, rigid blade which is skimmed across the material surface gradually pushing away any excess from the newly added material layer. In a more advanced form, the straight edged, rigid blade may comprise a hollow through which a vacuum can be applied. The blade is positioned a small distance from the required top surface level. Rather than push material away, such a device sucks excess material into the hollow as it passes across the surface. In regions where there is insufficient material remaining at the top surface, the vacuum effect is arrested and material is drawn from the hollow back onto the surface. Where the material to be treated is viscous, there may be a waiting time between recoats while the viscous top surface drains and settles. In some cases highly viscous materials may not drain and settle resulting in the top surface rising above the desired height and a consequent, detrimental effect on the quality of the component.

The Applicant's previously filed European Patent Application no. EP17150873, which was filed Oct. 1, 2017 and published as EP 3202560, describes a doctor blade which is configured to flex as it passes over a surface layer.

SUMMARY

In accordance with the present disclosure there is provided an additive layer manufacturing apparatus comprising a doctor blade having a tip which, in use, is arranged proximal to a material layer to be recoated during an additive layer manufacturing method, the doctor blade having a cavity with an inlet and an outlet, the outlet located at the tip and the inlet connectable to an air supply whereby air can be directed through the cavity to the outlet and onto the material layer.

The air supply may be a compressed air supply. The apparatus may further include a flow control device adjustable to vary the velocity and or pressure of the directed air supply. The apparatus may further include a temperature control device for adjusting and or maintaining the temperature of the compressed air supply. The blade may include features downstream of the outlet configured to control and/or direct air exiting the outlet. Without limitation, such features may include a grid, one or more nozzles, differently directed channels or the like. In an option, the blade tip may be tapered to provide a converging or diverging outlet.

In some embodiments, multiple doctor blades are provided. In an option, individual blades of the multiple doctor blades may have a different configuration to others of the multiple doctor blades. Optionally multiple blades may have the same structure but air supply to each is individually controllable. For example, individual blades may have individual supply lines and any given supply line may include a flow control device which is adjustable independently of a flow control device in another supply line.

The doctor blade may be flexible. The doctor blade may have an associated flexible element arranged to follow the tip of the doctor blade across the material layer to be recoated. The flexible doctor blade or flexible element may be configured to flex when drawn across the material layer in a first direction but inflexible when drawn across the material layer in a second direction which is opposite to the first direction.

The apparatus may include a build platform in an X-Y plane and an indexing device for moving the blade in a direction Z, orthogonal to the X-Y plane. The apparatus may include a build platform in an X-Y plane and an indexing device for moving the build platform in a direction Z, orthogonal to the X-Y plane.

In some embodiments the additive layer manufacturing apparatus may include a vat for containing a liquid material from which a 3 dimensional product is to be built and a device for initiating polymerisation of molecules in the liquid material. The device for initiating polymerisation may comprise a focusable light source in the ultraviolet to visible region of the electromagnetic spectrum and a transport mechanism for moving the source across a section of the liquid.

In other embodiments the additive layer manufacturing apparatus may include a container for a powdered material from which a 3 dimensional product is to be built and a device for initiating fusion of the powder. The device for initiating fusion of the powder may, for example, be a laser or an electron beam.

BRIEF DESCRIPTION OF DRAWINGS

Embodiments of the present disclosure will now be described with reference to the accompanying drawings in which.

DETAILED DESCRIPTION

Figure 1:
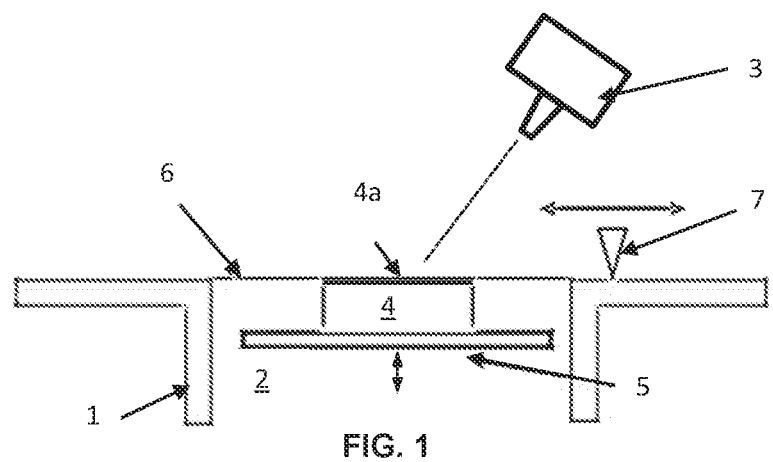
FIG. 1 shows a first known additive layer manufacturing apparatus suited to the building of a three dimensional product by photo-polymerisation of a liquid resin.

As can be seen in FIG. 1 an additive layer manufacturing apparatus comprises a vat 1 for containing a resin 2. A light source 3 is arranged to selectively focus on regions within layers of the resin 2 to initiate photo-polymerisation and build a 3 dimensional body of which a first layer 4 is shown. The first layer 4 is built on a build platform 5 which can be moved an upward and downward as represented by the two headed arrow beneath the build platform 5 in the Figure. The figure shows the top of the layer 4 just below the surface of the resin 6. The surface of the resin is substantially flat. This is typical at commencement of the additive layer manufacture and at a point where movement of the platform 5 has been arrested for some time. To build a second layer on to the first layer 4, the platform 5 is dropped into the resin 2 and then raised back to a surface level. This is sometimes termed "deep dipping".

Figure 2:
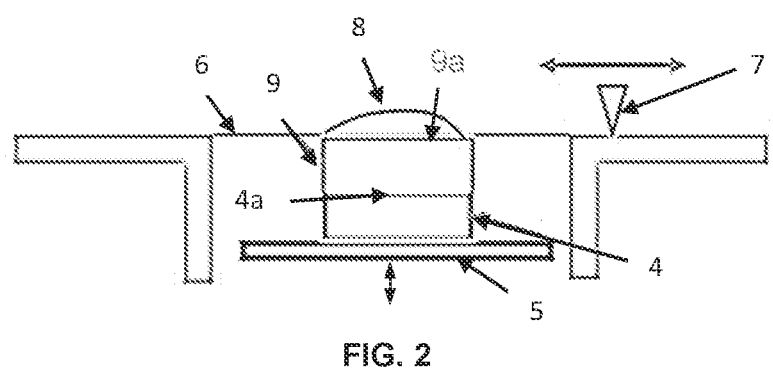
FIG. 2 shows the apparatus of FIG. 1 immediately after the build platform has been raised and before the doctor blade has been swept across the build platform.

FIG. 2 illustrates the apparatus of FIG. 1 immediately after deep dipping. A second layer 9 sits on top surface 4a of the first layer 4. Due to viscosity and surface tension in the resin 2 a mound 8 of resin is formed on the surface 9a of the second layer 9. There then follows a waiting period while resin the mound 8 redistributes forming a flatter layer. Where the resin 2 is highly viscous, this can significantly delay the manufacture a body.

The doctor blade 7 can be swept across the surface 6 to level the mound 8, however, when the build is only a few layers thick, this sweeping motion has an associated risk of stressing the build with a consequence of possible structural damage to the body.

Figure 3:
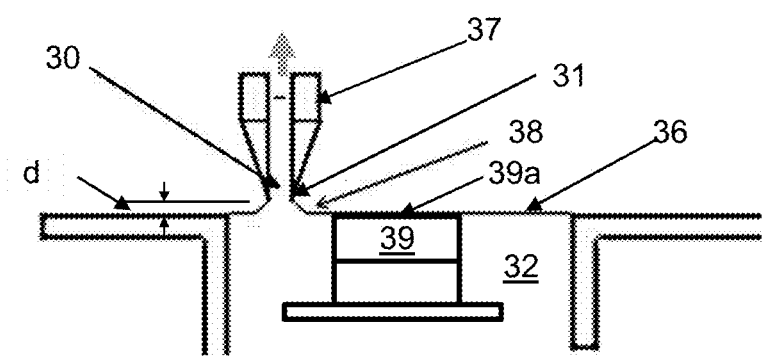
FIG. 3 shows a second known additive layer manufacturing apparatus which employs a vacuum doctor blade.

One solution to the problem of stresses resulting from the doctor blade is the vacuum doctor blade. An example is illustrated in FIG. 3. The vacuum doctor blade 37 is characterised by a cavity 30 extending from a tip 31 of the blade. The cavity 30 is connected to a suction device which removes air from the cavity 30 (as represented by the grey arrow above the blade) creating a vacuum effect at the tip 31. In use the tip 31 of vacuum doctor blade 37 is spaced a small distance d from the surface 36 of the resin 32. The distance is typically less than the thickness of a build layer. Since the tip is not directly contacting the surface 36, stress on the build is reduced compared to the arrangement of FIGS. 1 and 2. As the vacuum blade 37 is swept over the surface 36 of the resin 32 at a distance d from the surface, resin from the mound 38 (which is closer to the blade tip 31) is drawn into the cavity 30 by the vacuum and the surface 36 of the resin is thus flattened out.

Figure 4:
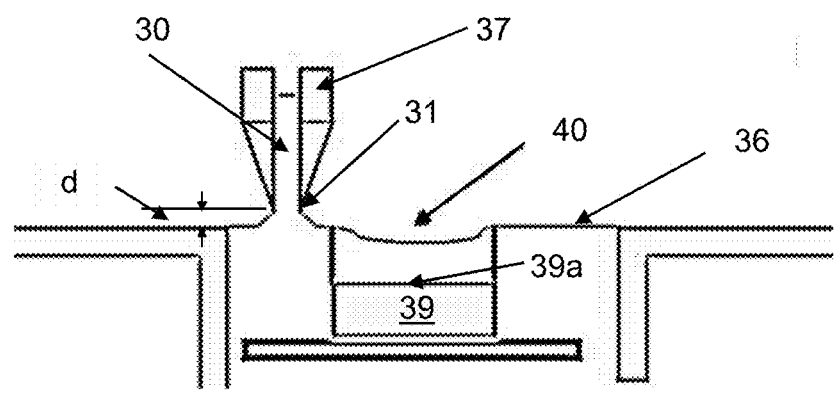
FIG. 4 shows the apparatus of FIG. 3 during a sweep of the vacuum doctor blade in a first direction.

Turning to FIG. 4, the vacuum doctor blade 37 has just made a pass over layer 39. To build a subsequent layer, the surface 39a of the already formed layer 39 is lowered beneath the resin surface 36 by a distance equating to the desired layer thickness. As a consequence of surface tension effects on the surface 39a of the already formed layer 39, a dip 40 results in the resin surface 36. To address this dip, the vacuum doctor blade 37 is swept in a reverse direction back over the surface layer 36. On this sweep, suction to the cavity 30 is ceased and consequently, as the tip 31 passes over dip 40, resin is released from the cavity 30 into the dip 40. Excess resin is now left on the surface 39a due to the stand-off height between the vacuum doctor blade 37 and the resin surface 36. This then requires a wait time to drain back off the surface 39a of the already formed layer 39.

Again, where the resin is highly viscous, there may be a considerable delay in the manufacture while the resin fills the dip 40.

Figure 5:
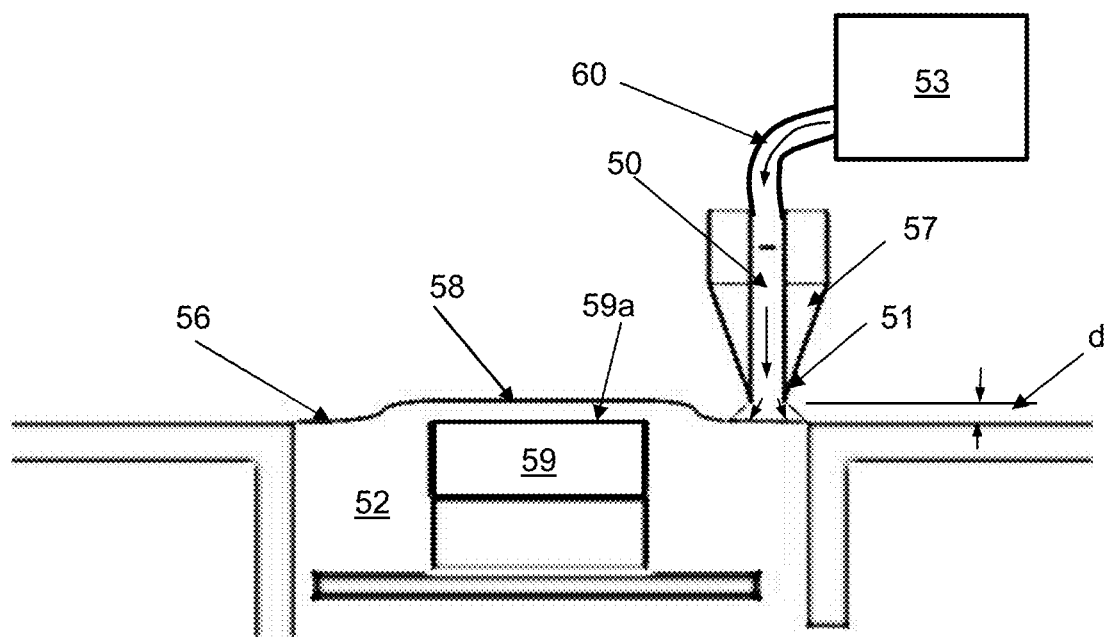
FIG. 5 shows an additive layer manufacturing apparatus in accordance with an embodiment of the present disclosure.

FIG. 5 illustrates an embodiment of an additive layer manufacturing apparatus in accordance with the present disclosure. The apparatus is shown at a point in the manufacture when a recently polymerised layer 59 has just been dipped in the resin 52 and raised back to the resin surface level 56 in a similar manner as described in relation to FIG. 2. A mound 58 is formed on the surface 59a of the polymerised layer 59. Much like the previously described vacuum doctor blade 37, the vacuum blade of this apparatus has a cavity 50 passing through the doctor blade 57. The cavity has an outlet at a tip 51 of the doctor blade 57. A conduit 60 connects the cavity 50 to an air supply 53 which forces air through the conduit 60 and the cavity 50 towards the surface 56 of the resin. The tip 51 of the blade is positioned a small distance d from the surface level 56 of the resin 52 such that there is no direct contact between the two.

Figure 6:
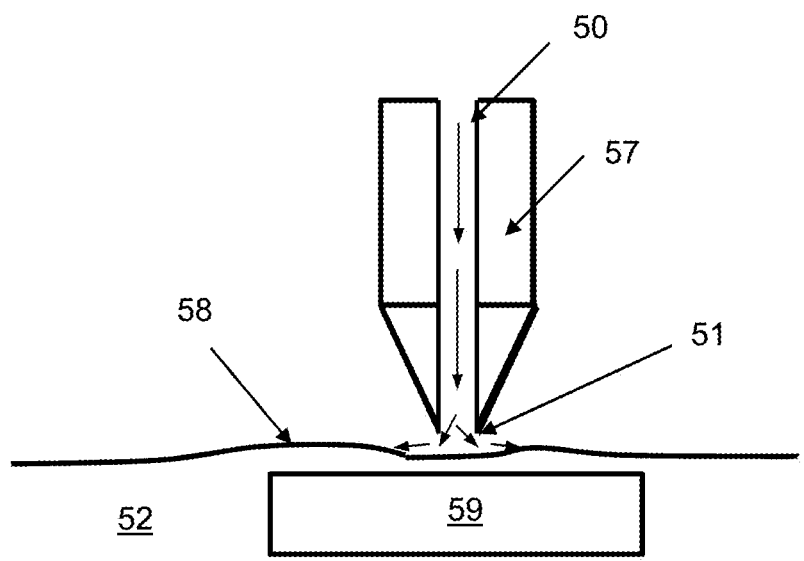
FIG. 6 shows the additive layer manufacturing apparatus of FIG. 5 midway during a sweep of the doctor blade.

As the blade passes over the mound, the air exiting the outlet forcibly spreads the mound 58 so as to smooth out the resin surface 56 into a flat surface more quickly than if the mound 58 were left to flow uninfluenced. This is illustrated in FIG. 6.

Figure 7:
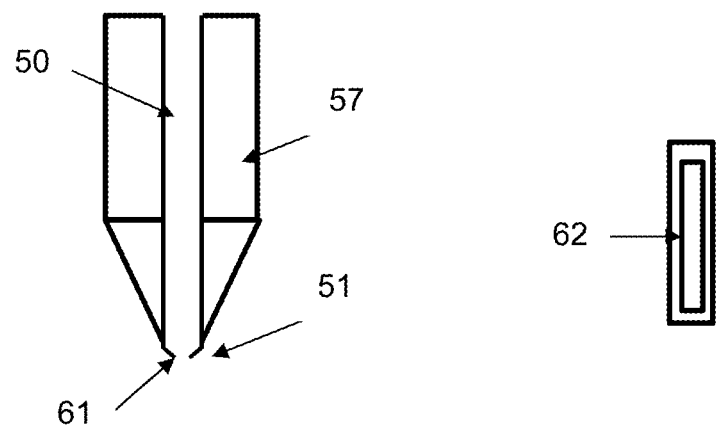
FIG. 7 shows a first modification of a doctor blade in accordance with the present disclosure.
Figure 8:
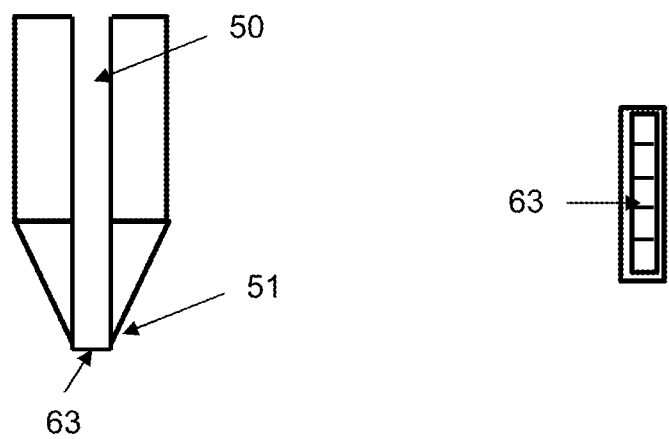
FIG. 8 shows a second modification of a doctor blade in accordance with the present disclosure.
Figure 9:
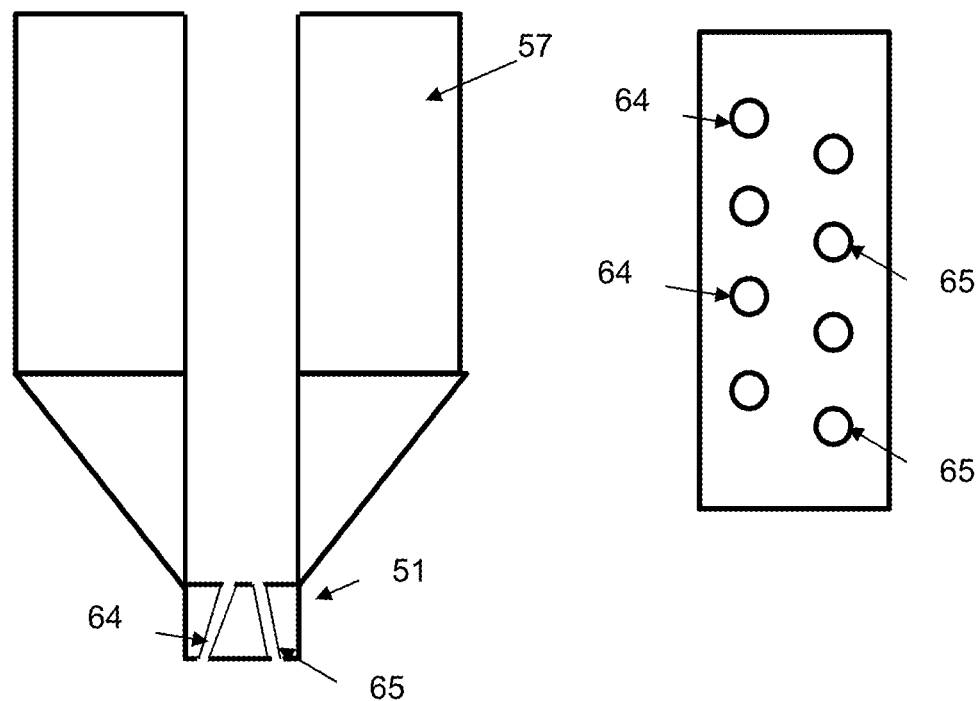
FIG. 9 shows a third modification of a doctor blade in accordance with the present disclosure.

FIGS. 7, 8 and 9 illustrate optional adaptations of the tip 51 to control flow of air exiting at the tip 51.

FIG. 7 shows a section and an end view of a first optional adaptation of the doctor blade. As can be seen, the cavity 50 has convergent walls 61 towards the tip 51 resulting in a narrowed slot 62 in the tip.

FIG. 8 shows a section and an end view of a second optional adaptation of the doctor blade. As can be seen the tip 51 end of the cavity 50 is covered by a grid 63.

FIG. 9 shows a section and an end view of a third optional adaptation of the doctor blade. As can be seen, the tip 51 comprises a wall through which differently directed channels 64, 65 are provided.

Figure 10:
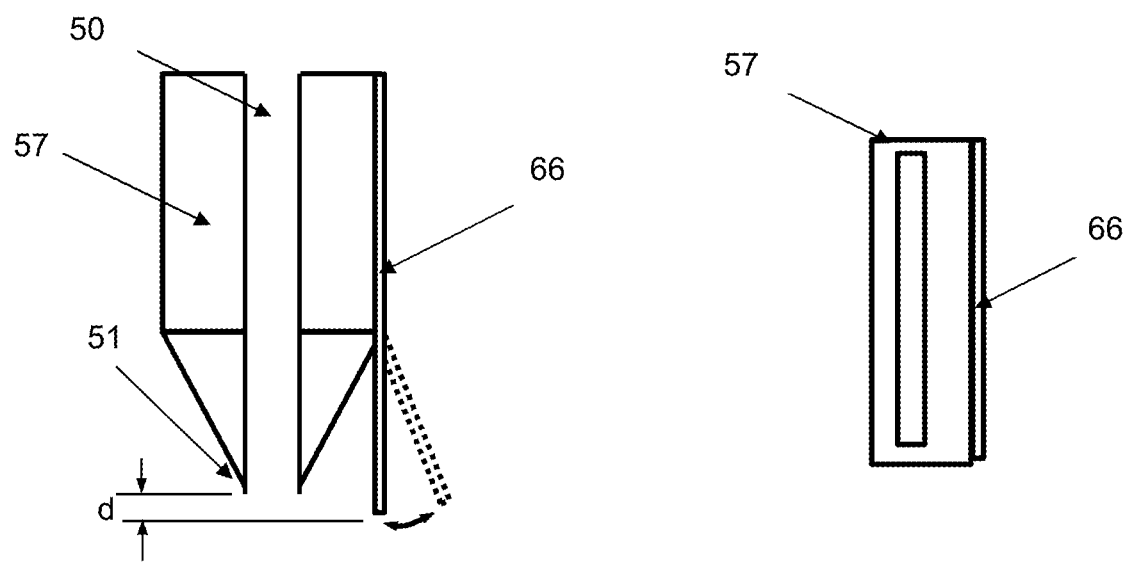
FIG. 10 shows a fourth modification of a doctor blade in accordance with the present disclosure.

FIG. 10 shows a section and an end view of a fourth optional adaptation of the doctor blade. As can be seen, the doctor blade 57 of this embodiment includes a follow blade 66 on one side of the doctor blade 57. The follower blade 66 is flexible as represented by the dotted outline and curved arrow in the Figure. When in its resting state, a tip of the flexible follower blade 66 extends beyond the tip 51 of the of the doctor blade 57 by a distance d. In use, whilst the tip 51 of the doctor blade 57 does not contact the surface of the resin, the tip of the follow blade contacts the surface of the resin. As the follow blade 66 is swept across the surface, it flexes thereby reducing stress on the surface layer.

Whilst the embodiment is directed to dissemination of a resin in a mound, it is to be appreciated that the doctor blade 57 and associated air supply 53 may also be used to fill efficiently a dip in a resin surface.

Whilst the embodiments are described in the context of vat photo-polymerisation based additive layer manufacturing methods, the apparatus of the present disclosure may be applied to other additive layer manufacturing methods, for example powder bed ALM.

It will be understood that the invention is not limited to the embodiments above-described and various modifications and improvements can be made without departing from the invention as defined by the accompanying claims. Except where mutually exclusive, any of the features may be employed separately or in combination with any other features and the disclosure extends to and includes all combinations and sub-combinations of one or more features described herein.

The invention claimed is:

1. An apparatus comprising a plurality of doctor blades, each of the doctor blades having a tip which, in use, is arranged proximal to a material layer to be recoated during an additive layer manufacturing method, and each of the doctor blades having a cavity with an inlet and an outlet, the outlet located at an outermost end of the respective tip and the inlet connectable to a respective air supply line whereby air can be directed through the cavity to the outlet and onto a surface of the material layer,
   wherein each of the doctor blades includes the respective supply line comprising a flow control device such that the air supplied to each of the doctor blades is individually controllable, and wherein each of the doctor blades includes a feature downstream of the outlet which is configured to control and/or direct air exiting the outlet.

2. The apparatus of claim 1 further comprising a compressed air supply connected to the respective supply line of each of the doctor blades.

3. The apparatus of claim 1 further comprising a vat for containing a liquid material from which a 3 dimensional product is to be built; and a focusable light source configured to initiate polymerisation of molecules in the liquid material.

4. The apparatus of claim 1 further comprising a container for a powdered material from which a 3 dimensional product is to be built; and a laser or an electron beam emitter for initiating fusion of the powdered material.

5. The apparatus of claim 4 comprising the laser for initiating fusion of the powdered material.

6. The apparatus of claim 4 comprising the electron beam emitter for initiating fusion of the powdered material.

* * * * *